United States Patent
Su et al.

(10) Patent No.: US 9,720,312 B2
(45) Date of Patent: Aug. 1, 2017

(54) PROJECTION SCREEN AND MANUFACTURING METHOD OF PROJECTION SCREEN

(71) Applicants: Fang-Hsuan Su, Hsin-Chu (TW); Chia-Chi Chung, Hsin-Chu (TW); Kai-Li Chen, Hsin-Chu (TW)

(72) Inventors: Fang-Hsuan Su, Hsin-Chu (TW); Chia-Chi Chung, Hsin-Chu (TW); Kai-Li Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/574,371

(22) Filed: Dec. 17, 2014

(65) Prior Publication Data
US 2016/0004150 A1   Jan. 7, 2016

(30) Foreign Application Priority Data
Jul. 4, 2014   (CN) .......................... 2014 1 0320283

(51) Int. Cl.
G03B 21/60   (2014.01)
G03B 21/58   (2014.01)
G03B 21/56   (2006.01)

(52) U.S. Cl.
CPC ............. G03B 21/60 (2013.01); G03B 21/56 (2013.01); G03B 21/58 (2013.01)

(58) Field of Classification Search
CPC ....... G03B 21/60; G03B 21/602; G03B 21/58
USPC ................................. 359/449, 459
See application file for complete search history.

(56) References Cited

U.S. PATENT DOCUMENTS

| | | | | |
|---|---|---|---|---|
| 3,510,197 A | * | 5/1970 | Fukke Hajime | G03B 21/602 359/455 |
| 3,598,470 A | * | 8/1971 | Vetter | G03B 21/602 359/455 |
| 3,893,748 A | * | 7/1975 | De Palma | G03B 21/60 359/455 |
| 4,190,320 A | * | 2/1980 | Ferro | G03B 21/602 359/455 |
| 5,296,965 A | | 3/1994 | Uetsuki et al. | |

(Continued)

FOREIGN PATENT DOCUMENTS

| | | |
|---|---|---|
| CN | 1373392 A | 10/2002 |
| CN | 1653385 | 8/2005 |

(Continued)

OTHER PUBLICATIONS

"Office Action of Europe Counterpart Application", issued on Nov. 16, 2015, p. 1-p. 9, in which the listed references were cited.

(Continued)

*Primary Examiner* — Christopher Mahoney
(74) *Attorney, Agent, or Firm* — Jianq Chyun IP Office

(57) ABSTRACT

A projection screen includes a flexible substrate, a reflective layer and a transparent coating layer. The flexible substrate has a first surface and a second surface opposite to each other. The reflective layer is disposed on the first surface of the flexible substrate. The transparent coating layer is coated on the reflective layer, and the transparent coating layer has a pattern on a surface opposite to the reflective layer. Moreover, a manufacturing method of the projection screen is also provided.

8 Claims, 7 Drawing Sheets

(56) References Cited

U.S. PATENT DOCUMENTS

| | | | | |
|---|---|---|---|---|
| 5,361,163 | A | * | 11/1994 | Matsuda ................ G03B 21/60 |
| | | | | 264/1.9 |
| 5,456,967 | A | | 10/1995 | Nezu |
| 6,067,266 | A | * | 5/2000 | Donelan ................ G09F 3/02 |
| | | | | 365/218 |
| 6,476,965 | B1 | * | 11/2002 | He ....................... B32B 27/08 |
| | | | | 359/443 |
| 6,842,282 | B2 | * | 1/2005 | Kuroda ................ G03B 21/602 |
| | | | | 359/449 |
| 7,158,299 | B2 | * | 1/2007 | Umeya ................ G03B 21/604 |
| | | | | 349/176 |
| 8,400,714 | B2 | * | 3/2013 | Howe .................. B32B 38/00 |
| | | | | 359/599 |
| 9,188,847 | B2 | * | 11/2015 | Maruta ................ G03B 21/60 |
| 2003/0197932 | A1 | | 10/2003 | Sinkoff |
| 2004/0202822 | A1 | * | 10/2004 | Bourdelais ............ B32B 7/02 |
| | | | | 428/143 |
| 2005/0275952 | A1 | | 12/2005 | Odagiri et al. |
| 2007/0035827 | A1 | * | 2/2007 | Shimoda ............ G03B 21/602 |
| | | | | 359/449 |
| 2007/0103910 | A1 | | 5/2007 | Brickey et al. |
| 2010/0171929 | A1 | | 7/2010 | Liu et al. |
| 2013/0027771 | A1 | | 1/2013 | Aoki |
| 2014/0092471 | A1 | * | 4/2014 | Sadahiro ............ G03B 21/60 |
| | | | | 359/449 |

FOREIGN PATENT DOCUMENTS

| | | |
|---|---|---|
| CN | 1771462 A | 5/2006 |
| CN | 2862114 Y | 1/2007 |
| CN | 200950204 Y | 9/2007 |
| CN | 201099026 Y | 8/2008 |
| CN | 101452197 A | 6/2009 |
| CN | 201514537 U | 6/2010 |
| CN | 201610012 | 10/2010 |
| CN | 102405142 A | 4/2012 |
| JP | 82935 | 8/1929 |
| JP | S61109039 | 5/1986 |
| JP | H10186522 | 7/1998 |
| JP | 2002091331 | 3/2002 |
| JP | 2005099259 | 4/2005 |
| JP | 2009134189 | 6/2009 |
| TW | M319856 | 10/2007 |
| WO | 2013088471 | 6/2013 |

OTHER PUBLICATIONS

"Office Action of Japanese Counterpart Application", issued on Feb. 2, 2016, p. 1-p. 3, in which the listed references were cited.
"Office Action of China Counterpart Application", issued on Aug. 2, 2016, p. 1-p. 10, in which the listed references were cited.

* cited by examiner

PROJECTION SCREEN AND MANUFACTURING METHOD OF PROJECTION SCREEN

CROSS-REFERENCE TO RELATED APPLICATION

This application claims the priority benefit of China application serial no. 201410320283.8, filed on Jul. 4, 2014. The entirety of the above-mentioned patent application is hereby incorporated by reference herein and made a part of this specification.

BACKGROUND

Technical Field

The invention relates to a projection screen and a manufacturing method of the projection screen, and particularly relates to a projection screen having a flexible substrate and a manufacturing method of the projection screen.

Related Art

Generally, there are two methods for manufacturing a whiteboard, one is to manufacture a glass whiteboard using glass as a substrate, and another one is to perform baking varnish on a back plate (i.e., a spray coating whiteboard). However, the above two whiteboards are all composed of a rigid material, for example, the glass substrate of the glass whiteboard or the back plate of the spray coating whiteboard, and has a disadvantage of unable to bend. Moreover, when the size of the whiteboard increases (for example, to be greater than 100 inches), the weight and space required in manufacturing of the whiteboard have to be considered.

On the other hand, since a writing surface of the current whiteboard is generally a plane, when user's hand touches the whiteboard, the user may have an unsmooth feeling, and a special surface treatment is required to be performed. Taking the glass whiteboard as an example, an etching process is required to produce a surface pattern; however, the etching process requires a specific chemical solution, which involves an issue of environmental protection. Moreover, when the current whiteboard is used as a projection screen, the gain of the image beam emitted by a projector cannot be achieved by the projection screen, which influences clarity and visual experience of a projection image.

Taiwan utility model No. M319856 discloses a flexible whiteboard. China utility model No. 201610012 discloses a whiteboard writing film. U.S. Patent Publication No. 20070035827 discloses a reflective projection screen. China Patent No. 1653385 discloses a projection screen. U.S. Patent Publication No. 20100171929 discloses a dry erasable projection article.

SUMMARY

Accordingly, the invention is directed to a projection screen, which is flexible, and is capable of providing clear projection images when serving as a projection screen.

Other objects and advantages of the invention can be further illustrated by the technical features broadly embodied and described as follows.

In order to achieve one or a portion of or all of the objects or other objects, an embodiment of the invention provides a projection screen including a flexible substrate, a reflective layer and a transparent coating layer. The flexible substrate has a first surface and a second surface opposite to each other. The reflective layer is disposed on the first surface of the flexible substrate. The transparent coating layer is coated on the reflective layer, and the transparent coating layer has a pattern on a surface opposite to the reflective layer.

In order to achieve one or a portion of or all of the objects or other objects, an embodiment of the invention provides a manufacturing method of a projection screen, which includes following steps. A flexible substrate is provided, where the flexible substrate has a first surface and a second surface opposite to each other. A reflective layer is formed on the first surface of the flexible substrate. A transparent coating layer is formed on the reflective layer, and the transparent coating layer has a pattern on a surface opposite to the reflective layer.

In an embodiment of the invention, the reflective layer includes a plurality of optical microstructures.

In an embodiment of the invention, the optical microstructures are granular.

In an embodiment of the invention, the optical microstructures are prismatic structures.

In an embodiment of the invention, each of the optical microstructures has a vertex angle, and the vertex angles are the same.

In an embodiment of the invention, each of the optical microstructures has a vertex angle, and the vertex angles of at least a part of the optical microstructures are different.

In an embodiment of the invention, the reflective layer is a plane.

In an embodiment of the invention, a thickness of the reflective layer is greater than or equal to 20 μm.

In an embodiment of the invention, a thickness of the transparent coating layer is smaller than or equal to 20 μm.

In an embodiment of the invention, a surface roughness of the transparent coating layer ranges from 3 μm to 3.5 μm.

In an embodiment of the invention, the projection screen further includes a bonding layer and a release layer. The bonding layer is located on the second surface of the flexible substrate, and is located between the release layer and the flexible substrate.

In an embodiment of the invention, a method of forming the reflective layer includes following steps. A first adhesive layer is coated on the flexible substrate. A first transfer printing roller is used to perform transfer printing on the first adhesive layer, and a light curing process is performed on the first adhesive layer to form the reflective layer.

In an embodiment of the invention, the first transfer printing roller has a plurality of transfer printing microstructures, so as to form a plurality of optical microstructures on the first adhesive layer.

In an embodiment of the invention, a method for forming the transparent coating layer includes following steps. A second adhesive layer is coated on the reflective layer. A second transfer printing roller is used to perform transfer printing on the second adhesive layer, a light curing process is performed on the second adhesive layer, and the second adhesive layer forms the pattern.

In an embodiment of the invention, the manufacturing method of the projection screen further includes following steps. After the transparent coating layer is formed, a bonding layer is coated on the second surface of the flexible substrate. A release layer is configured, where the bonding layer is located between the release layer and the flexible substrate.

According to the above descriptions, the embodiments of the invention have at least one of the following advantages or effects. The structure design of the flexible substrate of the projection screen of the invention avails a manufacturing process of the projection screen, and the pattern on the transparent coating layer can provide a comfortable touch feeling and functions of stain resistant, abrasion resistant, anti-glare and writing. Moreover, the transparent coating layer can also be used as a protection layer of the reflective layer, so as to reduce a risk of color change or deterioration of the reflective layer.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

The invention will now be described more fully with reference to the accompanying drawings, in which exemplary embodiments of the invention are shown. The terms used herein such as "above," "below," "front," "back," "left" and "right" are for the purpose of describing directions in the figures only and are not intended to be limiting of the invention.

Figure 1:
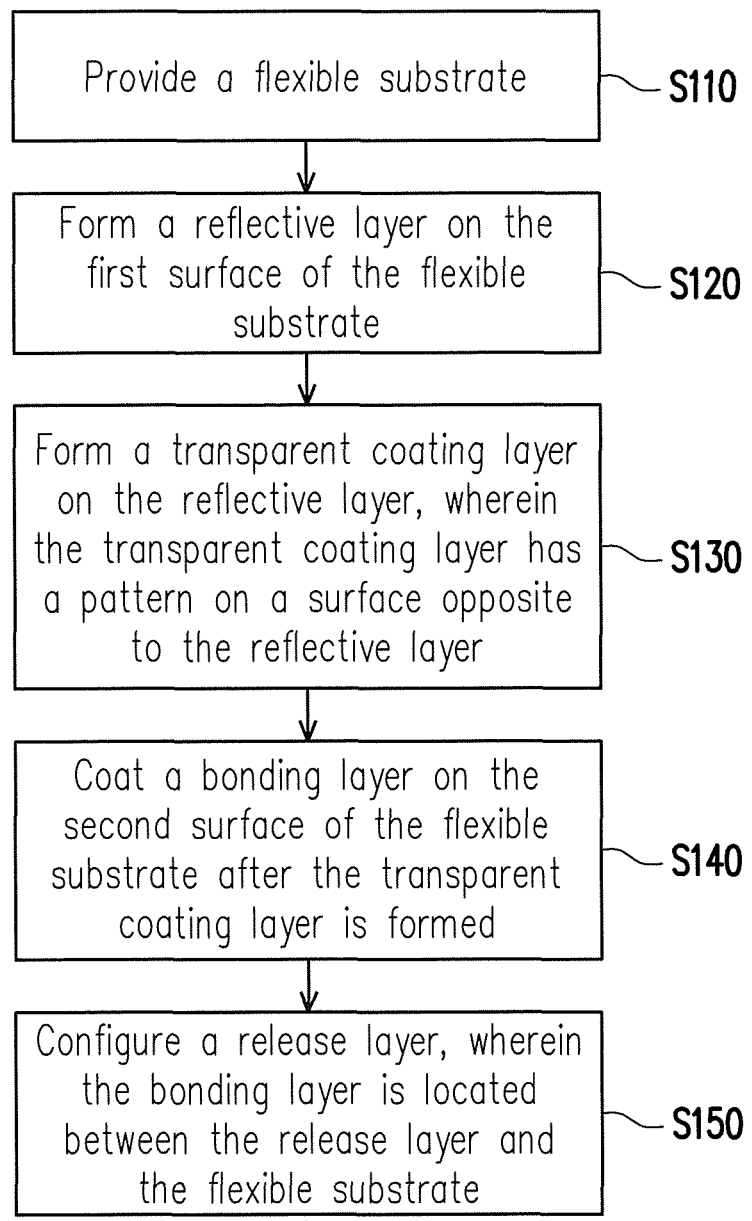
FIG. 1 is a flowchart illustrating a manufacturing method of a projection screen according to an embodiment of the invention.
Figure 2A:
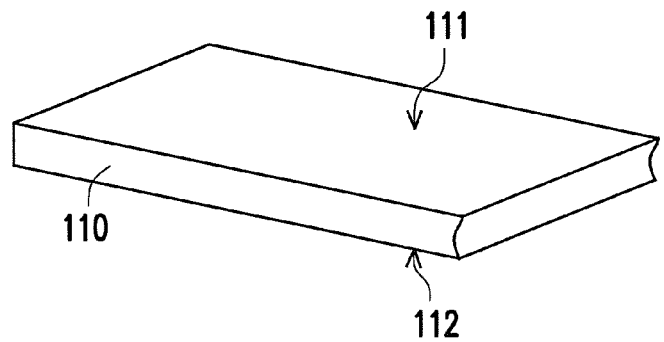
FIG. 2A to FIG. 2D illustrate manufacturing steps of the method of FIG. 1.

FIG. 1 is a flowchart illustrating a manufacturing method of a projection screen according to an embodiment of the invention. FIG. 2A to FIG. 2D illustrate manufacturing steps of the method of FIG. 1. FIG. 3 is a cross-sectional view of the projection screen according to an embodiment of the invention. Referring to FIG. 1 to FIG. 3, first, in step S110, a flexible substrate 110 is provided, as shown in FIG. 2A, the flexible substrate 110 has a first surface 111 and a second surface 112 opposite to each other. In the embodiment, the flexible substrate 110 is made of a transparent material, for example, polyethylene terephthalate (PET), or other suitable materials.

Figure 2B:
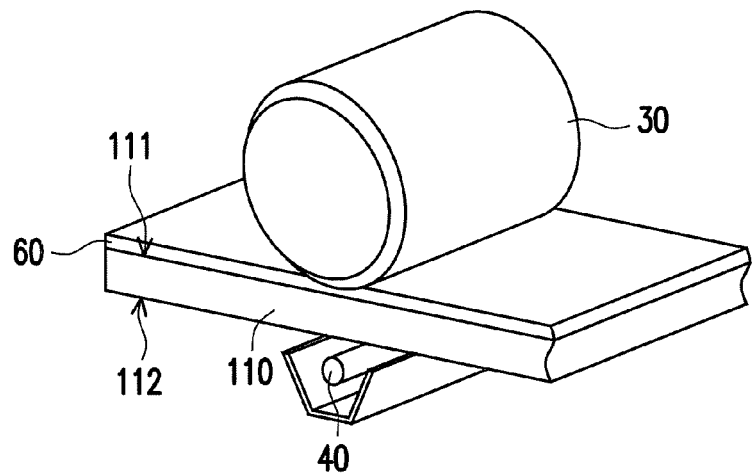
Figure 3:
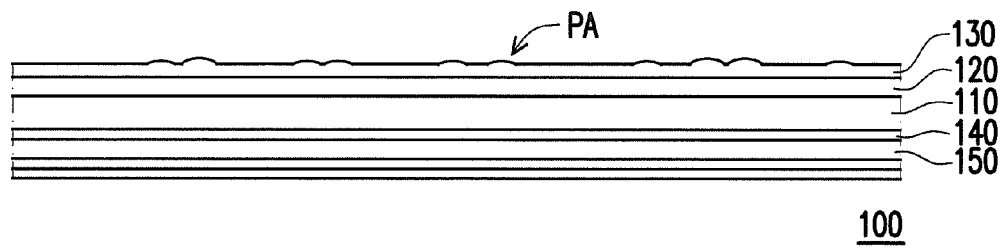
FIG. 3 is a cross-sectional view of a projection screen according to an embodiment of the invention.

Then, as shown in FIG. 2B, in step S120, a reflective layer 120 is formed on the first surface 111 of the flexible substrate 110. In the embodiment, the reflective layer 120 is made of a white material, and is used for reflecting light. In detail, a method of forming the reflective layer 120 is, for example, to coat a first adhesive layer 60 on the flexible substrate 110, wherein the first adhesive layer 60 is a light curing adhesive layer. For example, a method of coating the first adhesive layer 60 is to use a dispensing unit (not shown) to provide the first adhesive layer 60 to the flexible substrate 110. Meanwhile, as shown in FIG. 2B, a first transfer printing roller 30 is used to produce the reflective layer 120, a light curing process is performed to the first adhesive layer 60, where the first transfer printing roller 30 is, for example, a roller without any transfer printing microstructure on a surface thereof, though the invention is not limited thereto. Further, since the first adhesive layer 60 and the flexible substrate 110 are all made of flexible materials, the first transfer printing roller 30 may slightly sink into the first adhesive layer 60 during the manufacturing process, though the first transfer printing roller 30 does not touch the flexible substrate 110. In other words, due to a downward pressure exerted on the first adhesive layer 60 and the flexible substrate 110 by the first transfer printing roller 30, the first adhesive layer 60 and the flexible substrate 110 wrap the first transfer printing roller 30 along a part of contour of the first transfer printing roller 30. Moreover, in the embodiment, light emitted by a curing unit 40 can be used to irradiate the first adhesive layer 60 to cure the first adhesive layer 60, wherein the first adhesive layer 60 is, for example, only cured through ultraviolet irradiation without using other devices for heating. In this way, the reflectively layer 120 is formed. In detail, a thickness of the reflective layer 120 is greater than or equal to 20 μm. It should be noticed that the above value range is only an example, and is not used for limiting the invention.

Figure 2C:
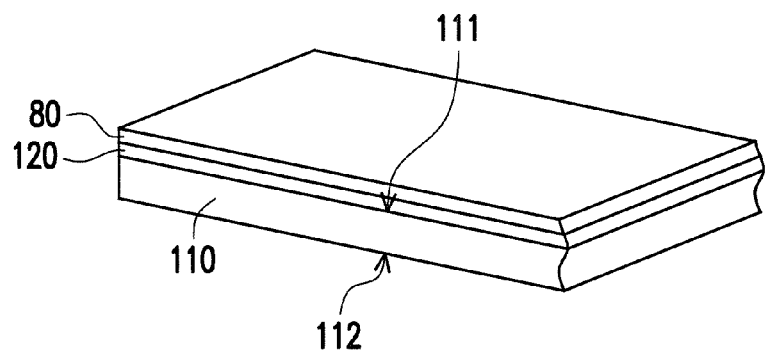
Figure 2D:
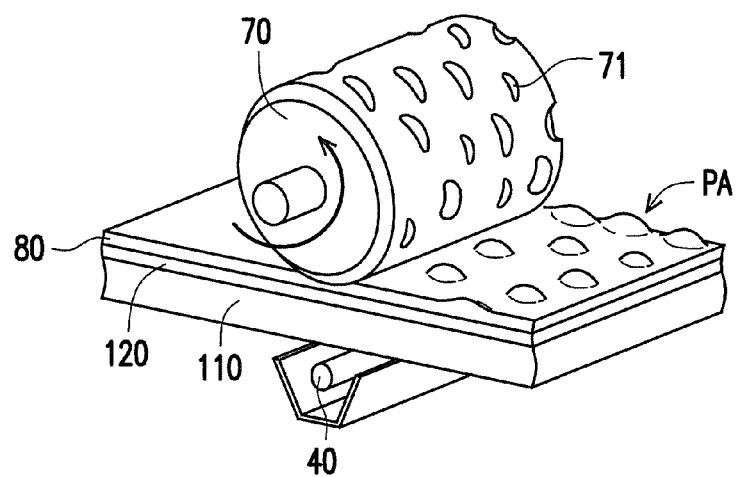

Then, as shown in FIG. 2C and FIG. 2D, in step S130, a transparent coating layer 130 is formed on the reflective layer 120. In detail, a method of forming the transparent coating layer 130 includes following steps. First, as shown in FIG. 2C, a second adhesive layer 80 is coated on the reflective layer 120. For example, the second adhesive layer 80 can also be provided by a dispensing unit (not shown). Then, as shown in FIG. 2D, a second transfer printing roller 70 is used to perform transfer printing on the second adhesive layer 80, and a light curing process is performed to the second adhesive layer 80 to form a pattern PA on the second adhesive layer 80.

Furthermore, in the embodiment, since the second adhesive layer 80 is also made of a flexible material, the second transfer printing roller 70 may also slightly sink into the second adhesive layer 80 due to a downward pressure exerted on the second adhesive layer 80 by the second transfer printing roller 70 during the manufacturing process, though the second transfer printing roller 70 does not touch the reflective layer 120 and the flexible substrate 110. In other words, the second adhesive layer 80 also wraps the second transfer printing roller 70 along a part of contour of the second transfer printing roller 70. Moreover, the second transfer printing roller 70 has a plurality of second transfer printing microstructures 71, wherein the second transfer printing microstructures 71 are, for example, irregularly distributed recesses, such that the pattern PA corresponding to the second transfer printing microstructures 71 can be formed on the second adhesive layer 80, however, the invention is not limited thereto, the second transfer printing microstructures 71 can also be irregularly distributed bumps or a concave-convex pattern in other embodiments, so as to form other types of concave-convex structures according to actual requirements. Therefore, the second transfer printing roller 70 can be used to perform transfer printing the second adhesive layer 80 on the reflective layer 120 and curing the second adhesive layer 80 simultaneously, so as to form the pattern PA corresponding to the second transfer printing microstructures 71 on the second adhesive layer 80. In the embodiment, the second adhesive layer 80 is also a light curing adhesive layer, and the light curing process performed on the second adhesive layer 80 is the same as the light curing process performed on the first adhesive layer 60, by which the light emitted by the curing unit 40 irradiates the second adhesive layer 80 to cure the second adhesive layer 80, and details thereof are not repeated.

In this way, the transparent coating layer 130 is formed, and the transparent coating layer 130 has the pattern PA on a surface opposite to the reflective layer 120. In detail, in the embodiment, a thickness of the transparent coating layer 130 is smaller than or equal to 20 μm, and a surface roughness of the surface of the transparent coating layer 130 opposite to the reflective layer 120 ranges from 3 μm to 3.5 μm. It should be noticed that the above value ranges are only an example, which are not used to be limiting of the invention.

Then, referring to FIG. 1 and FIG. 3, in step S140, and after the transparent coating layer 130 is formed, a bonding layer 140 is coated on the second surface 112 of the flexible substrate 110. For example, in the embodiment, the bonding layer 140 may provide one-off bonding or repetitive bonding. Then, in step S150, a release layer 150 is configured, which can be released from the bonding layer 140, and the bonding layer 140 can be adhered to a suitable surface, for example, a wall, etc., wherein the bonding layer 140 is located between the release layer 150 and the flexible substrate 110.

In this way, the projection screen 100 shown in FIG. 3 is formed. In detail, as shown in FIG. 3, in the embodiment, the projection screen 100 includes the flexible substrate 110, the reflective layer 120, the transparent coating layer 130, the bonding layer 140 and the release layer 150. The reflective layer 120 is disposed on the first surface 111 of the flexible substrate 110. The transparent coating layer 130 is coated on the reflective layer 120, and the transparent coating layer 130 has the pattern PA on a surface opposite to the reflective layer 120. The bonding layer 140 is located on the second surface 112 of the flexible substrate 110, and is located between the release layer 150 and the flexible substrate 110. When the projection screen 100 is to be fixed, a user can rip off the release layer 150 to expose the bonding layer 140, and adhere the projection screen 100 to a suitable position for usage.

In this way, based on a structural design of forming the reflective layer 120 on the flexible substrate 110, the projection screen 100 is flexible, which avails the manufacturing process. Moreover, based on the pattern PA of the transparent coating layer 130, the projection screen 100 can provide a comfortable touch feeling and functions of stain resistant, abrasion resistant, anti-glare, etc. Furthermore, based on the pattern PA, a surface friction of the transparent coating layer 130 is enhanced, and ink of a dry-erase marker is easy to be adhered to and wiped off from the surface of the transparent coating layer 130, such that the projection screen 100 has a whiteboard function. In addition, since the reflective layer 120 of the projection screen 100 is located between the transparent coating layer 130 and the flexible substrate 110, and is not exposed in the air, a risk of color change or deterioration of the reflective layer 120 is decreased. In other words, the transparent coating layer 130 can serve as a protection layer of the reflective layer 120.

It should be noticed that although the aforementioned reflective layer 120 is a plane, the invention is not limited thereto. In other embodiments, the surface of the reflective layer 120 that faces the transparent coating layer 130 can be formed with a plurality of optical microstructures through the transfer printing roller, which is described below with reference of FIG. 4A to FIG. 7.

Figure 4A:
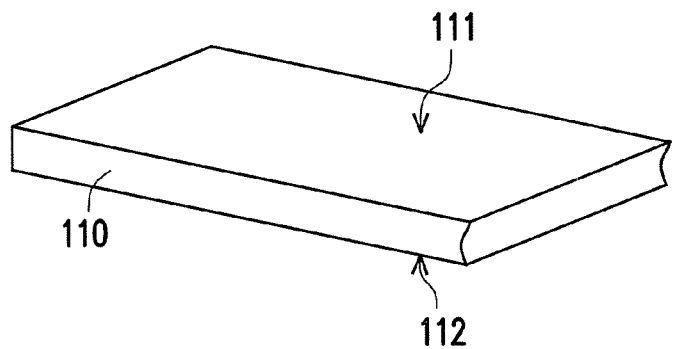
FIG. 4A to FIG. 4C illustrate another method of forming a reflective layer of FIG. 1.
Figure 4B:
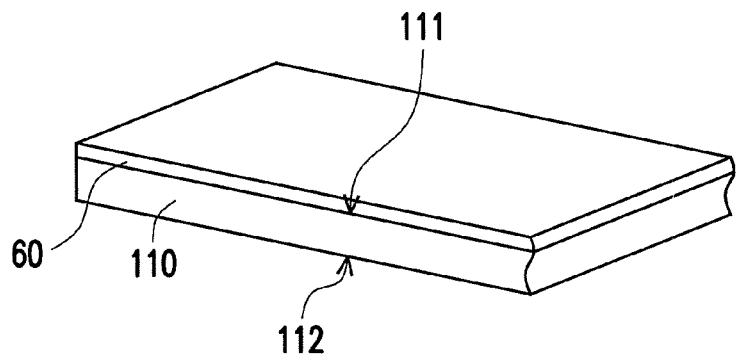
Figure 4C:
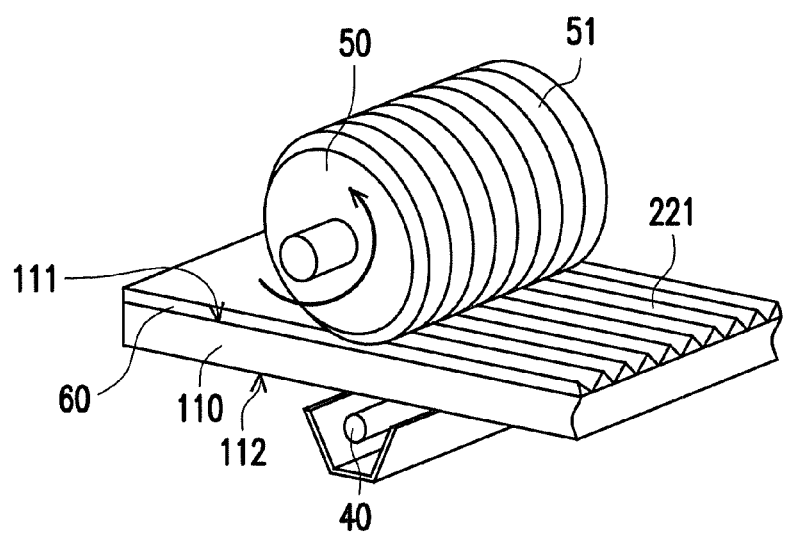

FIG. 4A to FIG. 4C illustrate another method of forming the reflective layer of FIG. 1. Referring to FIG. 4A to FIG. 4C, in the embodiment, the manufacturing steps shown in FIG. 4A to FIG. 4B are the same as the manufacturing steps shown in FIG. 2A to FIG. 2B, which are not repeated herein. The manufacturing step shown in FIG. 4C is similar to the manufacturing step shown in FIG. 2C, and the difference there between is as follows. In the embodiment, when the step S120 of FIG. 4C is executed, a first transfer printing roller 50 performs transfer printing to the first adhesive layer 60, and a light curing process is performed to the first adhesive layer 60, so as to form a plurality of optical microstructures 221 on the first adhesive layer 60. For example, the first transfer printing roller 50 has a plurality of first transfer printing microstructures 51, wherein the first transfer printing microstructures 51 are, for example, bar-shaped prismatic structures, such that prismatic structures corresponding to the first transfer printing microstructures 51 are formed on the first adhesive layer 60. In this way, a reflective layer 220 including a plurality of optical microstructures 221 is formed, however, the invention is not limited thereto, the first transfer printing microstructures 51 can also be irregularly distributed recesses, bumps or a concave-convex pattern, so as to form other types of microstructures according to an actual requirement in other embodiments.

Figure 5A:
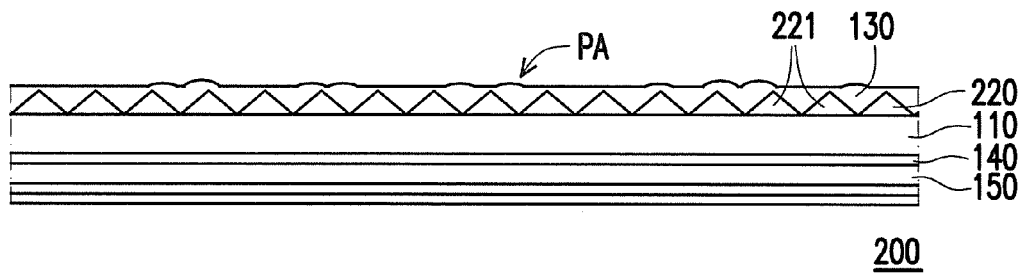
FIG. 5A is a cross-sectional view of a projection screen according to another embodiment of the invention.
Figure 5B:
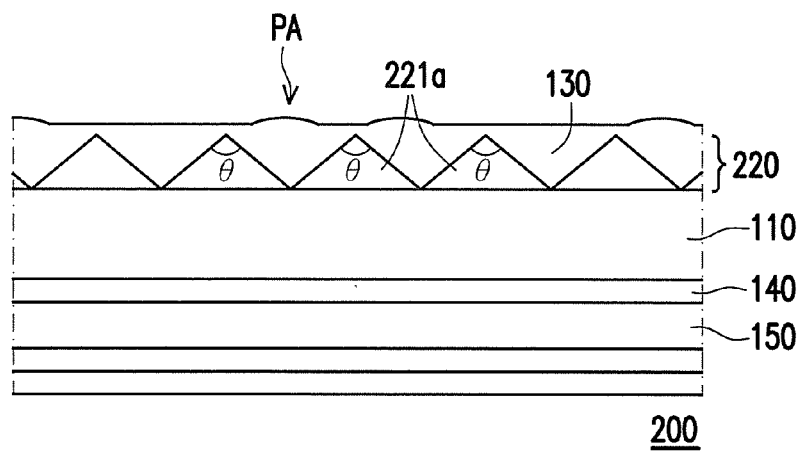
FIG. 5B is a cross-sectional view of optical microstructures of FIG. 5A.

FIG. 5A is a cross-sectional view of a projection screen according to another embodiment of the invention. FIG. 5B is a cross-sectional view of optical microstructures of FIG. 5A. Referring to FIG. 1, FIG. 5A and FIG. 5B, after the reflective layer 220 shown in FIG. 4C is formed, the step S130, the step S140 and the step S150 shown in FIG. 2D are executed to form a projection screen 200 (shown in FIG. 5A). In detail, as shown in FIG. 5B, in the embodiment, each optical microstructure 221 of the reflective layer 220 has a vertex angle θ, which can be used to adjust a reflecting angle of light reflected by the reflective layer 220 to converge the light. In this way, the projection screen 200 can adjust a reflecting angle of an image beam emitted from a projector to achieve a light converging effect, so as to provide a clear projection image to achieve a comfortable visual experience. In detail, the vertex angles θ of the optical microstructures 221a are the same. However, in another embodiment, the vertex angles θ of the optical microstructures 221a can be different, which is described below with reference of FIG. 5C.

Figure 5C:
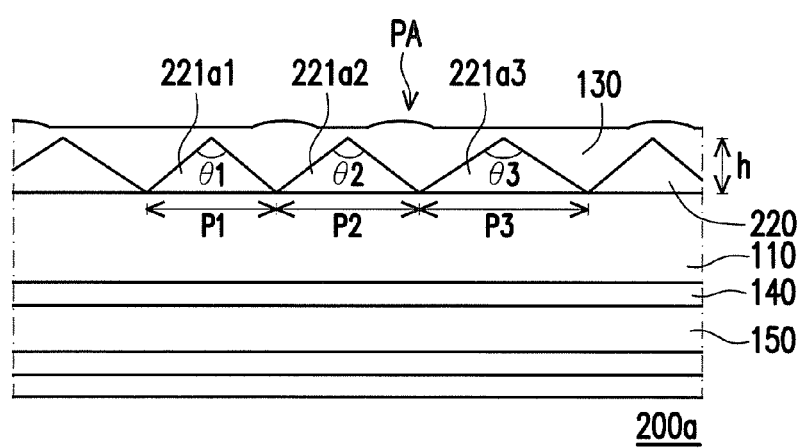
FIG. 5C is a cross-sectional view of another type of optical microstructures of FIG. 5A.

FIG. 5C is a cross-sectional view of another type of the optical microstructures of FIG. 5A. Referring to FIG. 5C, a projection screen 200a of FIG. 5C is similar to the projection screen 200 of FIG. 5B, and the difference there between is that the vertex angles θ1, θ2 and θ3 of at least a part of optical microstructures 221a1, 221a2 and 221a3 in the reflective layer 220 of the projection screen 200a are different. For example, in the embodiment, the method of forming different vertex angles θ1, θ2 and θ3 of the optical microstructures 221a1, 221a2 and 221a3 is achieved by adjusting ratios between widths P1, P2 and P3 and a height h of the optical microstructures 221a1, 221a2 and 221a3. In detail, the optical microstructures 221a1, 221a2, 221a3 have the same height h, though the widths P1, P2 and P3 of the optical microstructures 221a1, 221a2 and 221a3 have a relationship of P1<P2<P3, such that the vertex angles θ1, θ2 and θ3 of the optical microstructures 221a1, 221a2 and 221a3 have a relationship of θ1<θ2<θ3. In this way, each of the optical microstructures 221a1, 221a2 and 221a3 can be used to adjust the lights incident to the reflective layer 220a in different angles. For example, when the image beam with a large angle is reflected by the reflective layer 220, the image beam can be gained through different optical structures 221a1-221a3, so as to improved clarity and visual experience of the projection image. It should be noticed that the relationship of the vertex angles θ1, θ2 and θ3 of the optical microstructures 221a1, 221a2 and 221a3 is not limited to be θ1<θ2<θ3, and the vertex angle of each optical microstructure can be adjusted in collaboration with a light incident angle, so as to provide the user the best visual experience.

On the other hand, the structure design of the flexible substrate 110 of the projection screens 200 and 200a of the invention avails a manufacturing process, and the pattern PA on the transparent coating layer 130 can provide a comfortable touch feeling and functions of stain resistant, abrasion resistant, anti-glare and writing. Moreover, the transparent coating layer 130 can also be used as a protection layer of the reflective layers 220 and 220a, so as to reduce a risk of color change or deterioration of the reflective layers 220a and 220a. Therefore, the projection screens 200 and 200a also have the advantages mentioned in the description of the projection screen 100, and details thereof are not repeated.

Figure 6:
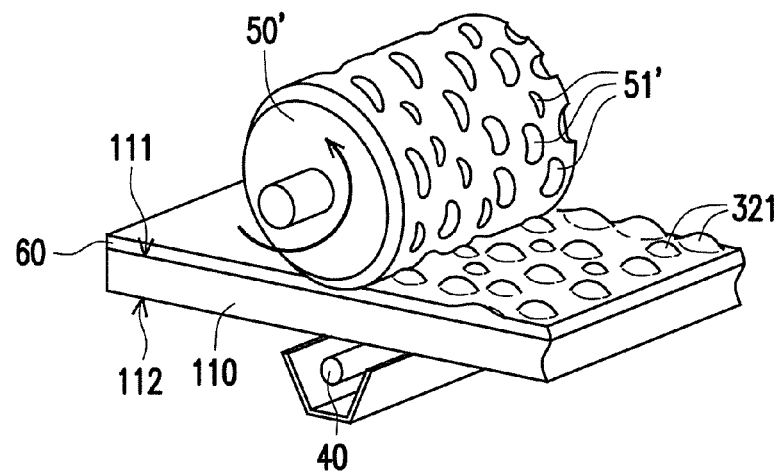
FIG. 6 illustrates another manufacturing step of forming the reflective layer of FIG. 1.
Figure 7:
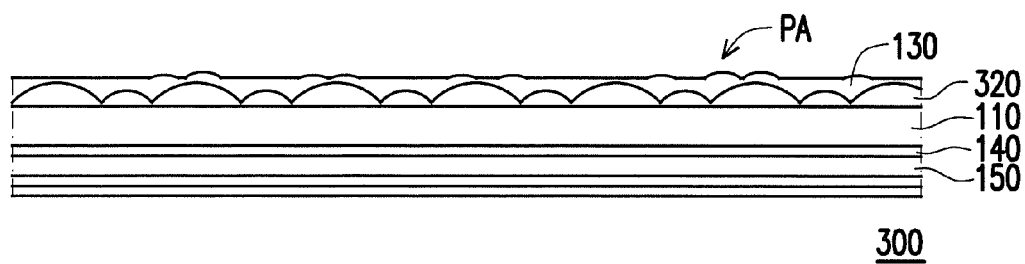
FIG. 7 is a cross-sectional view of a projection screen according to another embodiment of the invention.

FIG. 6 illustrates another manufacturing step of forming the reflective layer of FIG. 1. FIG. 7 is a cross-sectional view of a projection screen according to another embodiment of the invention. Referring to FIG. 6, in the embodiment, the manufacturing step shown in FIG. 6 is executed after the manufacturing steps of FIG. 4A and FIG. 4B are completed, and the manufacturing step of FIG. 6 is similar to that of FIG. 4C, and a main difference there between is as follows. In the embodiment, the first transfer printing microstructures 51' of the first transfer printing roller 50' are, for example, an irregularly distributed concave-convex pattern, so that a granular pattern corresponding to the first transfer printing microstructures 51' can be formed on the first adhesive layer 60. In this way, a reflective layer 320 including a plurality of optical microstructures 321 is formed.

Furthermore, referring to FIG. 1, after the reflective layer 320 shown in FIG. 6 is formed, the steps S130, S140 and S150 shown in FIG. 2D are executed to form the projection screen 300 (shown in FIG. 7). In detail, as shown in FIG. 7, since the optical microstructures 321 of the reflective layer 320 are granular, and can be used to adjust the angle of the light reflected by the reflective layer 320. For example, when the light is reflected by the reflective layer 320, the light is scattered to different directions by the optical microstructures 321, such that the projection image has a wider viewing angle. In this way, the projection screen 300 can also adjust a reflection angle of image beam emitted from a projector to achieve a light spreading effect, so as to provide the projection image with a wider viewing angle and achieve a comfortable visual impression. It should be noticed that each two of the optical microstructures 321 in FIG. 6 have a gap there between, and the optical microstructures 321 of FIG. 7 are connected to each other. However, the invention is not limited thereto, the arranging methods of the above two types of optical microstructures 321 can be coexisted on the reflective layer 320 according to an actual demand.

In the embodiment, the structure design of the flexible substrate 110 may avail the manufacturing process of the projection screen 300, and the pattern PA on the transparent coating layer 130 can provide a comfortable touch feeling and functions of stain resistant, abrasion resistant, anti-glare and writing. Moreover, the transparent coating layer 130 can also be used as a protection layer of the reflective layer 320, so as to reduce a risk of color change or deterioration of the reflective layer 320. Therefore, the projection screen 300 also have the advantages mentioned in the description of the projection screen 100, and details thereof are not repeated.

Figure 8:
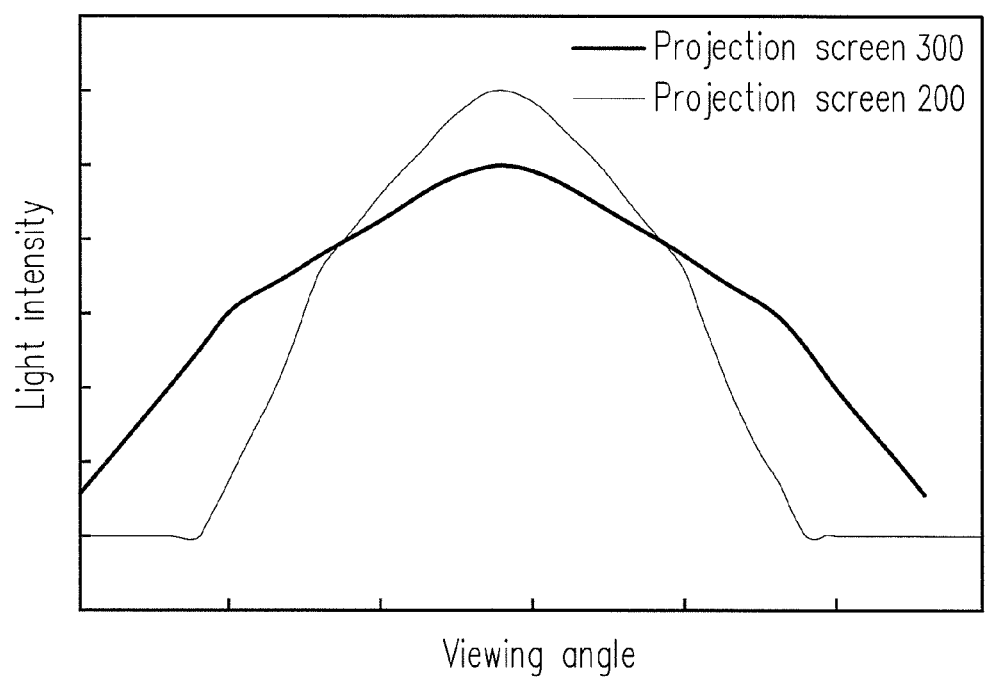
FIG. 8 is a schematic diagram of viewing angle distributions of light reflected by projection screens of FIG. 5A and FIG. 7.

FIG. 8 is a schematic diagram of viewing angle distributions of light reflected by the projection screen 200 of FIG. 5A and the projection screen 300 of FIG. 7, in which the horizontal axis represents viewing angles of the light viewed by the user after the light is reflected by the projection screen 200 of FIG. 5A and the projection screen 300 of FIG. 7, and the vertical axis represents light intensity. As shown in FIG. 8, the light reflected by the projection screen 200 of FIG. 5A is focused at a center of the projection screen 200, i.e., the viewing angle of the light viewed by the user is relatively small, such that the light has higher light gain to achieve a light converging effect. On the other hand, the light reflected by the projection screen 300 of FIG. 7 is spread, i.e., the viewing angle of the light viewed by the user is relatively wider to achieve a light spreading effect, such that the light has a soft visual impression.

In summary, the structure design of the flexible substrate of the projection screen of the invention avails a manufacturing process of the projection screen, and the pattern on the transparent coating layer can provide a comfortable touch feeling and functions of stain resistant, abrasion resistant, anti-glare and writing. Moreover, the transparent coating layer can also be used as a protection layer of the reflective layer, so as to reduce a risk of color change or deterioration of the reflective layer. On the other hand, the projection screen can also adjust the angle of the reflected light through the reflective layer, so as to provide clear projection images and achieve a comfortable visual impression.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents. Moreover, any embodiment of or the claims of the invention is unnecessary to implement all advantages or features disclosed by the invention. Moreover, "first," "second," etc. mentioned in the specification and the claims are merely used to name the elements and should not be regarded as limiting the upper or lower bound of the number of the components/devices. Moreover, the abstract and the name of the invention are only used to assist patent searching, and are not used for limiting the claims of the invention.

What is claimed is:

1. A projection screen, comprising:
   a flexible substrate, having a first surface and a second surface opposite to each other;
   a reflective layer, disposed on the first surface of the flexible substrate, wherein the reflective layer is a white, light curing adhesive layer; and
   a transparent coating layer, coated on the reflective layer, and the transparent coating layer having a pattern on a surface opposite to the reflective layer, wherein a surface roughness of the surface of the transparent coating layer opposite to the reflective layer ranges from 3 µm to 3.5 µm, the reflective layer comprises a plurality of optical microstructures on a surface facing the transparent coating layer, and a thickness of the reflective layer is greater than or equal to 20 µm.

2. The projection screen as claimed in claim 1, wherein the optical microstructures are granular.

3. The projection screen as claimed in claim 1, wherein the optical microstructures are prismatic structures.

4. The projection screen as claimed in claim 3, wherein each of the optical microstructures has a vertex angle, and the vertex angles are the same degree.

5. The projection screen as claimed in claim 3, wherein each of the optical microstructures has a vertex angle, and the vertex angles of at least two of the optical microstructures are different.

6. The projection screen as claimed in claim 1, wherein a surface of the reflective layer facing the transparent coating layer is a plane.

7. The projection screen as claimed in claim 1, wherein a thickness of the transparent coating layer is smaller than or equal to 20 μm.

8. The projection screen as claimed in claim 1, further comprising:
- a bonding layer, located on the second surface of the flexible substrate; and
- a release layer, wherein the bonding layer is located between the release layer and the flexible substrate.

\* \* \* \* \*